C. S. ROBISON.
PROCESS OF TREATING BREWERS' SLOPS.
APPLICATION FILED NOV. 1, 1909.
1,016,291.
Patented Feb. 6, 1912.
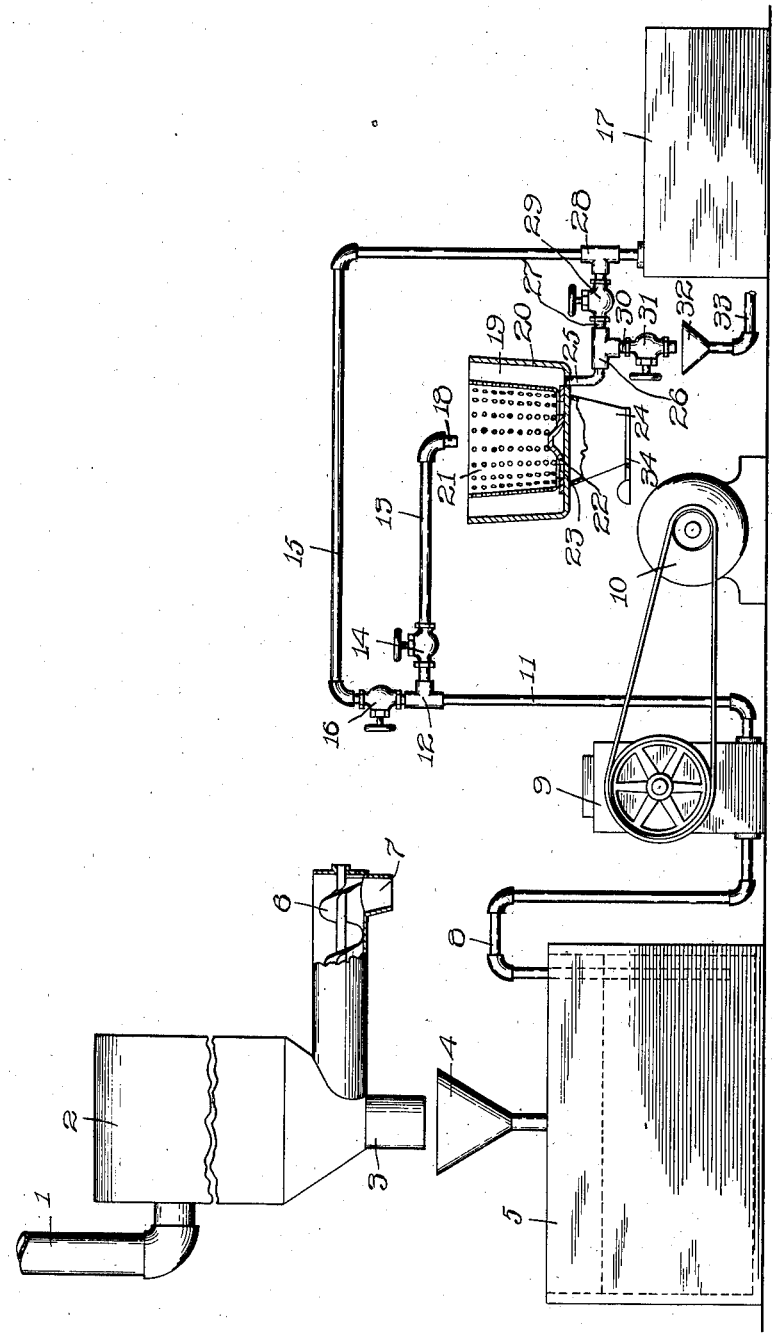
Witnesses
Frank J. Thelen
Leonard W. Novander.
Inventor
Clinton S. Robison
By Brown & Williams
Attorneys

UNITED STATES PATENT OFFICE.

CLINTON S. ROBISON, OF CHICAGO, ILLINOIS.

PROCESS OF TREATING BREWERS' SLOPS.

1,016,291.  Specification of Letters Patent.  Patented Feb. 6, 1912.

Application filed November 1, 1909. Serial No. 525,626.

*To all whom it may concern:*

Be it known that I, CLINTON S. ROBISON, a citizen of the United States, residing at Chicago, in the county of Cook and State of Illinois, have invented a certain new and useful Improvement in Processes of Treating Brewers' Slops, of which the following is a full, clear, concise, and exact description, reference being had to the accompanying drawings, forming a part of this specification.

My invention relates to a process for the recovery of salvage from grain drying.

In my co-pending application, Serial No. 514,069, filed August 21, 1909, I have described a process for accomplishing much the same result which I obtain in the present invention. In the above-named application, however, I perform the salvage operations by means of passing through a filter press the liquor obtained from brewers' slops after the first separation has been made, by which the coarser materials are separated from the liquor. It is well known that in this first preliminary separation a considerable amount of solid material passes through the screen which is used to effect the separation, and this solid material is allowed to go to waste, together with the solution which contains a considerable portion of sugars. According to my improved method, the material which has been wasted in this way is now recovered. There are several variations which may be used in connection with my process. The fundamental idea in the present invention is to effect the separation of the liquid and solid constituents by means of a centrifugal separator. According to the processes which are usually employed a preliminary separation, as explained above, is made, by which most of the solid materials are removed from the brewers' slops. The filtrate is passed through a centrifugal separator and the balance of the solid material is thereby removed. I have found that the operation of a centrifugal separator is such that but little additional drying is necessary after the solid material is removed from the separator.

In my co-pending application above-mentioned I have stated that after the filtrate resulting from the first separation of solid material from brewers' slops is itself filtered, this second resulting filtrate may be evaporated and the sugars and other constituents held in solution may be recovered thereby. Also, I explained that instead of passing the filtrate resulting from the first separation through a filter press, this first filtrate could itself be evaporated, thereby recovering the solid constituents and the constituents held in solution at the same time. Similarly, in my present process I subject the filtrate from the first separation to centrifugal action and thereby separate all of the remaining material held in suspension, whereas the filtrate may be subjected to evaporation and the constituents held in solution may thereby be recovered. Suitable piping connections are used so that the filtrate resulting from the first separation may be passed directly to the evaporator, if so desired.

In the accompanying drawing I have illustrated apparatus which may be used to carry out my invention.

The slops from the breweries are received through pipe 1, from which they are delivered to the hopper 2, which contains rotatable screens or some other suitable device for extracting the water from the slops. For the sake of simplicity, these screens are not shown in the drawing, but are of comparatively coarse mesh so that a considerable amount of solid material passes through them. The filtrate which passes through these screens, as explained above, contains a considerable amount of solid material and is delivered through the outlet 3 into the funnel 4, from which it passes into the storage tank 5.

The solid material remaining in the hopper 2 is carried by the conveyer 6 to the delivery pipe 7, at which point this material is collected, dried, and placed on the market as cattle feed. The mixture in the tank 5 is removed as desired through pipe 8 by means of pump 9, which is operated by the motor 10. The liquid and the solids held in suspension, after passing through pump 9, pass through pipe 11 to the T coupling 12. Connected with one branch of the T coupling 12 is the pipe 13, in which is placed the valve 14; while connected with the other branch of the T coupling is the pipe 15, in which is the valve 16. The pipe 15 connects directly with the evaporator 17, whereas the pipe 13 is provided with an outlet 18, from which the liquor may be delivered to the centrifugal separator 19. This centrifugal separator 19 may be of any well known type, but preferably consists of an outer shell 20 and an inner rotatable portion 21. This portion 21 preferably consists of two screens in which the perforations are formed by punching, these screens holding between them one or more layers of a filter cloth, such as canvas or the like. A base plate 22 is provided below the rotatable portion 21 and there are openings 23 in this base plate, through which the solid material retained within the rotatable portion 21 may be passed into the delivery spout 24. For the sake of simplicity, the driving mechanism of the centrifugal separator is not shown in the drawing, but is constructed in any of the well known ways which are familiar to all mechanics.

Connecting with the space between the rotary member 21 and the shell 20 is the pipe 25, in which is placed the T connection or T coupling 26. Connected with one branch of this T coupling is the pipe 27, which connects with pipe 15 by means of T coupling 28. In pipe 27 is placed the valve 29. Also connected with the T coupling 26 is the pipe 30, in which is placed the valve 31. This pipe delivers into the funnel 32, which is connected with waste pipe 33.

The operation of my process may now be thoroughly understood. The liquor is forced through pipe 11 by means of pump 9, and if it is desired to evaporate the liquor with no further treatment, valve 14 is closed and valve 16 opened. If, however, it is desired to separate the solid materials from the liquor contained in the tank 5, valve 16 is closed and valve 14 opened. The centrifugal separator 19 is placed in operation and the liquor passes through pipe 13 and delivery pipe 18 into the upper part of the separator, in which the solid materials are retained within the rotatable portion 21, and the filtrate is forced through the revolving screens and the canvas into the space between the shell 20 and the rotatable portion 21. This filtrate passes through pipe 25 and, if it is desired to evaporate the same, the valve 29 may be opened and valve 31 closed, the solution thereby being caused to pass into the separator 17. If on the other hand, it is not desired to evaporate the filtrate, valve 29 is closed and valve 31 opened, and the filtrate passes through pipe 30 into funnel 32 and from thence into waste pipe 33.

In some of the improved types of centrifugal separators it is possible to have a steady delivery of the solid materials retained in the rotatable portion 21 into the delivery spout 24, from which they may be withdrawn by removing the gate 34. In other types of separators it is necessary to periodically stop the separator and to remove the solid materials which are contained therein either by tilting the separator or by forcing the solid materials downward into the delivery outlet. My process is equally applicable to use with any kind of centrifugal separator, but I prefer the form in which the solid materials are delivered through the bottom of the separator, as less labor is involved in this way and a greater production is obtained.

The solid material which is delivered through the outlet 24 may be subjected to further drying in any of the well known types of drying ovens, or in some cases may be used with no further drying.

Many changes could be made in the details of the process which I have described without departing from the spirit of my invention.

What I claim as new and desire to cover by United States Letters Patent is:

1. The herein described process which comprises in first drawing the fluid portion from brewers' slops, and subjecting said fluid portion to centrifugal action, thereby removing the insoluble solid material held in suspension in said fluid portion.

2. The herein described process which consists in first drawing the fluid portion from brewers' slops, subjecting said fluid portion to centrifugal action to remove the insoluble solid material held in suspension, and drying the solid material so removed.

3. The herein described process which comprises first drawing the fluid portion from brewers' slops, and immediately subjecting said fluid portion alone to centrifugal action, thereby removing the insoluble solid material held in suspension in said fluid portion.

In witness whereof, I hereunto subscribe my name this 29th day of October, A. D. 1909.

CLINTON S. ROBISON.

Witnesses:
 HENRY M. HUXLY,
 A. A. THOMAS.